United States Patent Office 3,551,806
Patented Dec. 29, 1970

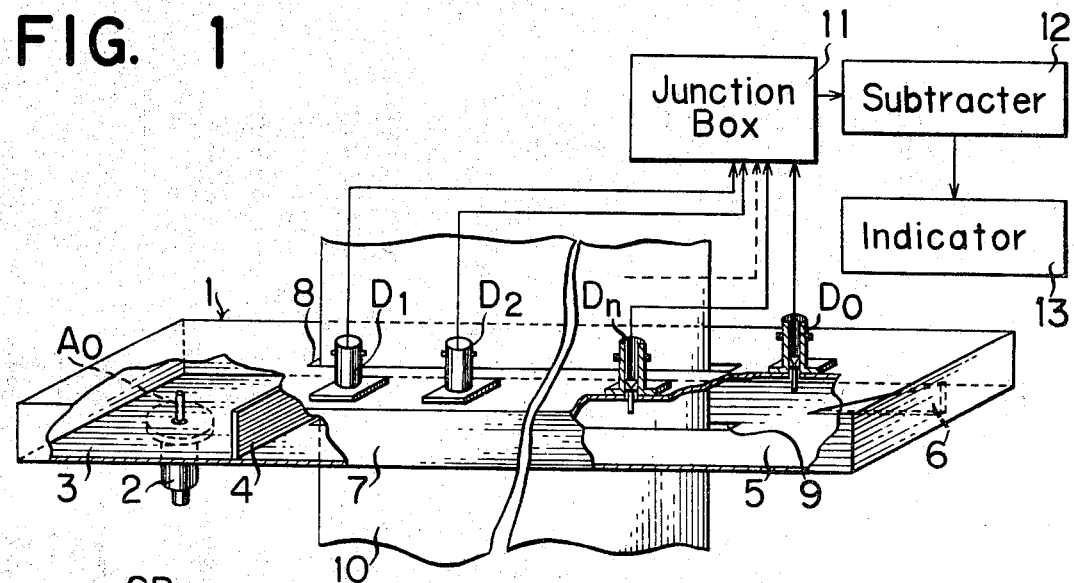

3,551,806
MICROWAVE APPARATUS FOR DETERMINING MOISTURE CONTENT OF HYGROSCOPIC WEBS, ESPECIALLY DURING MANUFACTURE
Shinichi Sasaki, 5-17-19 Tokiwa-cho, Urawa-shi, Saitama-ken, Japan
Filed Apr. 1, 1968, Ser. No. 717,601
Claims priority, application Japan, Apr. 3, 1967, 42/20,856, 42/20,857; Feb. 15, 1968, 43/9,295
Int. Cl. G01r 27/04
U.S. Cl. 324—58.5         4 Claims

ABSTRACT OF THE DISCLOSURE

An apparatus for determining the amounts of moisture contained in a sample of, for example, paper which is being continuously transported. At one end of a rectangular waveguide is disposed an exciter member for supplying microwaves, at the other end a detecting member for detecting transmitted microwaves, on the opposite walls of the central part a slot for allowing the passage of the aforesaid material and on one side wall thereof a plurality of spatially arranged detection terminals. To the detecting member and detection terminals is connected an indicator so as to electrically determine and display the amounts of moisture contained in the whole or part of the aforementioned material.

BACKGROUND OF THE INVENTION

This invention relates to an apparatus for determining the amounts of moisture contained in hygroscopic webs as of fiber, cloth, pulp or other materials, especially in samples of such webs or similar articles during manufacture by utilizing the attenuation phenomenon of microwaves caused by the moisture content.

The conventional apparatus of the aforementioned type comprises an instrument for measuring the attenuation of microwaves assembled from a microwave generator disposed at one end of a rectangular waveguide and a detector positioned at the other end. The instrument is so constructed as to determine the attenuation of microwaves caused by the moisture content of samples while they are transferred through the slots perforated in the opposite walls of the center of the waveguide. However, an apparatus of such construction can only measure the average moisture content of all that part of the sample which is being carried through the waveguide, but is incapable of indicating a distribution of moisture content in the sample.

Accordingly, an object of the invention is to provide an improved moisture content determining apparatus which enables the moisture content in any part of the sample to be measured.

Another object of the invention is to provide such an improved structure of a waveguide as will enable the measuring instrument to display excellent accuracy and sensitivity.

SUMMARY OF THE INVENTION

The aforementioned objects are realized by a novel arrangement providing the required number of detection terminals on one side wall of a waveguide, combining outputs from these detection terminals in various ways in a junction box and introducing said combined outputs into a subtracter for indication. The present invention may also permit the determination of the moisture content in any desired part of the sample by forming a waveguide from a plurality of cavity resonators and providing an excitation input terminal and a microwave detecting terminal for each resonator.

BRIEF DESCRIPTION OF THE DRAWING

FIG. 1 is a schematic diagram in perspective view of an embodiment of the present invention using a rectangular waveguide, with parts thereof broken away; and FIGS. 2 and 3 schematically show in section other embodiments of the present invention using a waveguide formed from a plurality of cavity resonators.

DESCRIPTION OF THE EMBODIMENTS

There will now be described an embodiment of the present invention using a rectangular waveguide. To one end of a rectangular waveguide 1 is fitted a microwave generator 2 consisting of, for example, a klystron to form an exciter member 3.

The klystron should be fitted in such a manner that it is positioned at a prescribed space, for example, $\lambda/4$ from the end wall of the waveguide in the direction of the central axis thereof. This arrangement can be carried out by constructing the exciter member in the piston form so as to render the aforementioned space adjustable. The illustrated exciting method will afford a mode of $$TE_{10}(H_{10})$$

The aforementioned exciter member is fitted with a mode filter 4 which is formed, for example, from a metal wire stretched on a frame member fitted into the section of the waveguide 1. At the other end of the waveguide 1 is formed a detecting member 5. On the end wall of the detecting member 5 is fitted as illustrated a terminal unit 6 for ensuring non-reflective resistance termination, which is shaped like a relatively long-tapered, right-angled triangle and agrees with the prescribed mode, for example, $H_{10}$, and which is prepared, for example, by coating a Bakelite plate with carbon or forming a metal film on the surface of a thin sheet composed of powders of mica and glass. Further, on the outside of one wall of the detecting member 5 is disposed a detector $D_0$ built in a high frequency connector (for example, the BNC type) assembled from a plug and receptacle. To the conductor placed in said receptacle is connected a detection circuit comprising, for example, a diode. The end of said conductor protrudes into the waveguide. In the central part 7 of a pair of opposite walls of the waveguide are perforated slots 8 and 9 in the axial direction of the waveguide. Through these slots is carried during transit a sample 10 of fiber, cloth, pulp, etc. whose moisture content is to be determined. To permit the passage of the sample through the waveguide, it is desired that the waveguide be so constructed as to be separated in a plane including the slots. On one wall of the waveguide perforated with the slot 8 are fitted a plurality of detectors $D_1$ to $D_n$ of the same construction as the detector $D_0$ in parallel to the slot 8 at prescribed intervals. Outputs from these detectors $D_1$ to $D_n$ as well as from the detector $D_0$ are introduced into a junction box 11 by means of the aforementioned high frequency connector plug receptacle and a coaxial cable adapted therefor. The junction box 11 is so constructed as to group the outputs $d_1$ to $d_n$ of the detectors $D_1$ to $D_n$ into pairs, for example, $d_1$ to $d_3$, $d_2$–$d_4$ . . . $d_{n-2}$–$d_n$ and transmit at least one or all of the pairs. These outputs are transferred to a subtracter member 12, which is formed from one or more electronic subtracters such as an analogue type subtracter, in accordance with the amounts of the aforementioned outputs thus transferred. The output terminal of the subtracter is connected to an indicator member 13, which consists of an electronic tube type indicator, if required, grouped with a counter or the like. The indicator member 13 exhibits output signals from the subtracter either directly or by appropriate conversion.

There will now be described the functional operation of an embodiment of the present invention constructed in the aforementioned manner. The microwave generator 2 included in the exciter member 3 of the waveguide 1 generates microwaves for its excitation at an input terminal $A_0$ disposed therein. The microwaves generated are transmitted to the detecting member 5 of the waveguide 1, where they are terminated non-reflectively. During transit the microwaves are attenuated correspondingly to the amounts of moisture contained in the sample being carried through the slots provided in the central part 7 of the waveguide 1. Thus the microwave outputs of different strengths detected by the detectors $D_1$ to $D_n$ are obtained as electrical signals $d_1$ to $d_n$ respectively. These electrical signals $d_1$ to $d_n$ are introduced into the junction box 11, where they are grouped into pairs, for example, $d_1-d_3$, $d_2-d_4$ . . . $d_{n-2}-d_n$. The succeeding subtracter 12 computes difference in the levels of these pairs of signals. The results of such computation are exhibited by the following indicator 13. Thus the extent of attenuation of microwaves, namely the moisture content of each prescribed portion of the sample is clearly determined in transit through the waveguide 1. In the case of the foregoing embodiment, the moisture content of the sample 10 is measured by detectors $D_1$ to $D_n$ positioned at the prescribed intervals along the entire width of the sample, so that information is obtained on a distribution of moisture content in the whole region of the sample. The detector $D_0$ is intended for use in measuring the moisture content of the entire sample at once and employed as often as required. The junction box 11 carries out an appropriate grouping of electrical signals $d_1$ to $d_n$ and enables the extent of measuring the sample to be set freely, and consequently the moisture content of any desired part of the sample to be determined.

There will now be described another embodiment of the present invention by reference to FIG. 2. This embodiment involves a waveguide 1 constructed by connecting in series a plurality of cavity resonators $CR_1$ to $CR_n$ resonating with excitation waves instead of the rectangular waveguide used in the embodiment shown in FIG. 1. At the ends 3 and 5 of the waveguide are disposed an excitation input terminal $A_0$ and a detector $D_0$ respectively. And each of the other excitation input terminals $A_1$ to $A_n$ is provided for each of the other detectors $D_1$ to $D_n$. All the aforementioned excitation input terminals are connected to a microwave generator 2 by a coaxial line through a switching box $SB_1$ consisting of, for example, a coaxial switch. This connection, of course, involves a coaxial line to waveguide conversion by means of matching or the like using, for example, a probe, with a mode of $H_{011}$. On the other hand, the detectors $D_0$ and $D_1$ to $D_n$ are all constructed in the same manner as in the embodiment of FIG. 1, excepting that the end of the inner conductor of the detector $D_0$ is curved along the terminal wall. The electrical output signals $d_0$ and $d_1$ to $d_n$ from the detector terminals are transferred to a switching box $SB_2$ of the same construction as the switching box $SB_1$ for example. One of these outputs is selected by switch and displayed by an indicator 13. The switching action of the switching box $SB_2$ is interlocked with that of the switching box $SB_1$. For instance, when microwaves are supplied to the input terminals $A_0$ by the switching action of the switching box $SB_1$, then the electric signal $d_0$ from the detector $D_0$ or an output terminal is transmitted to the indicator 13 by the switching action of the switching box $SB_2$. Similarly, an output derived from an input to the excitation input terminal $A_n$ is detected by the detector $D_n$. The joints between the cavity resonators are provided with an impedance matching element using an inductive or capacitive window or the like for the matching of impedance throughout the entire waveguides. The same parts of the embodiment of FIG. 2 as those of the embodiment of FIG. 1 are denoted by the same numerals and description thereof is omitted.

The embodiment of FIG. 2 enables different amounts of moisture contained in the various parts of the sample 10, namely, corresponding to the cavity resonators $CR_1$ to $CR_n$ to be measured in the form of different degrees of attenuation of microwaves in these resonators by the operation of switching boxes $SB_1$ and $SB_2$. The use of a resonator as a waveguide permits the attenuation of microwaves resulting from the moisture content of a sample to appear more prominently than in the embodiment of FIG. 1, thus considerably improving the sensitivity of measurement.

There will now be described still another embodiment of the present invention by reference to FIG. 3. While the embodiment of FIG. 2 involves a waveguide formed from a plurality of cavity resonators $CR_1$ to $CR_n$ connected in series, the embodiment of FIG. 3 comprises a plurality of partition walls $H_0$ to $H_n$ provided at an interval of about $n\lambda g/2$ (where $\lambda g$ represents the wavelength of the microwave in the waveguide, and $n$ the number of the cavity resonators) on the inner surface of two opposite walls of the rectangular waveguide 1 which are not perforated with a slot 8. Between the central part 7, exciter member 3 and detecting member 5 of the waveguide are positioned matching sections 31 and 32. The individual components ponents of each pair of partition walls are so arranged as to oppose each other at a prescribed interval across the axial center of the waveguide. The regions defined by these partition walls respectively form cavity resonators $CR_1$ to $CR_n$ and perform a function the same as or similar to the resonators involved in the embodiment of FIG. 2. Input terminals $A_0$ to $A_n$ and detector terminals $D_0$ to $D_n$ are connected in the same manner as in the embodiment of FIG. 2.

While the principles of the invention have been described above in connection with specific embodiments, and particular modifications thereof, it is to be clearly understood that this description is given only by way of illustration and not as a limitation on the scope of the invention.

What I claimed is:

1. In an apparatus for determining moisture content including a wave guide having at least one side and a microwave generator, said waveguide being provided at one end with an exciter member connected to said microwave generator to excite microwaves and a detecting member at the other end of said wave guide for detecting the microwaves and terminating theim without causing their reflection and at least two perforations on two opposite walls intermediate between said exciter member and said detector member in the form of slots permitting the passage of a sample the improvement therein comprising a plurality of detectors located along said side intermediate between the slots at a prescribed interval to detect microwaves appearing at each location, selecting means for freely selecting outputs from the individual detectors as well as from the detecting member, and indicating means for indicating the output thus drawn out by the selecting means.

2. In an apparatus for determining moisture content including a wave guide having at least one side and a microwave generator, said waveguide being provided at one end with an exciter member connected to said microwave generator to excite microwaves and a detecting member at the other end of said wave guide for detecting the microwaves and terminating them without causing their reflection and at least two perforations on two opposite walls intermediate between said exciter member and said detector member in the form of slots permitting the passage of a sample, the improvement therein comprising a plurality of detectors located along said side intermediate between the slots at a prescribed interval to detect microwaves appearing at each location, selecting means for freely selecting outputs from the individual detectors as well as from the detecting members formed from a junction box for grouping outputs from the individual detectors as well as from the detecting member into the desired pairs of outputs, a subtractor for carrying out subtraction with respect to each such pair, and, indicating means for indicating the output thus drawn out by the selecting means.

3. In an apparatus for determining moisture content including a wave guide having at least one side and a microwave generator, said waveguide being provided at one end with an exciter member connected to said microwave generator to excite microwaves and a detecting member at the other end of said wave guide for detecting the microwaves and terminating them without causing their reflection and at least two perforations on two opposite walls intermediate between said exciter member and said detector member in the form of slots permitting the passage of a sample, the improvement therein comprising a plurality of detectors located along said side intermediate between the slots at a prescribed interval to detect microwaves appearing at each location, first selecting means for freely selecting outputs from the individual detectors as well as from the detecting member, a plurality of separate exciting means and a second selecting means wherein the waveguide is formed from the number of resonators corresponding to said separate exciting means, each of said resonators being provided with one of the aforementioned detectors and one of said exciting means so as to excite in said resonator outputs from the microwave generator as selected by said second selecting means, interlocking means which interlock said first and second selecting means, and, indicating means for indicating the output thus drawn out by the selecting means.

4. An apparatus as claimed in claim 3, wherein said plurality of resonators is formed from a plurality of partition walls terminating in matching sections at both ends of the waveguide, said resonators being used in series to improve sensitivity.

References Cited

UNITED STATES PATENTS

| | | | |
|---|---|---|---|
| 2,457,695 | 12/1948 | Liskow | 324—58.5X |
| 3,079,551 | 2/1963 | Walker | 324—58.5 |
| 3,115,131 | 12/1963 | Holliday | 324—58.5X |

EDWARD E. KUBASIEWICZ, Primary Examiner